I. D. WALTER.
DEMOUNTABLE RIM FOR WHEELS.
APPLICATION FILED NOV. 1, 1915.
1,181,088.  Patented Apr. 25, 1916.
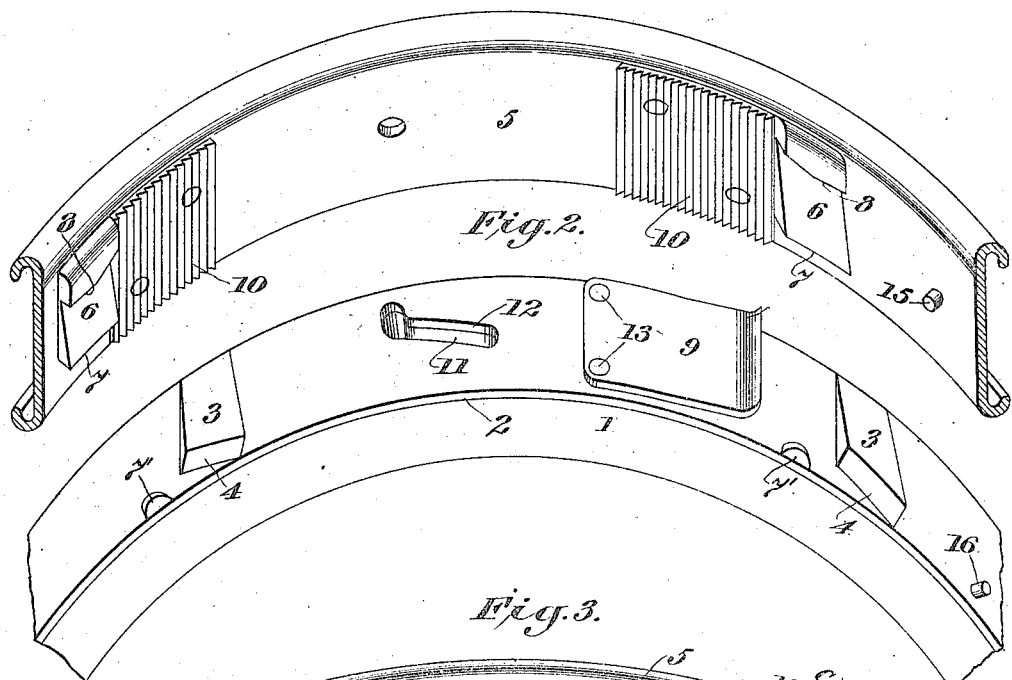
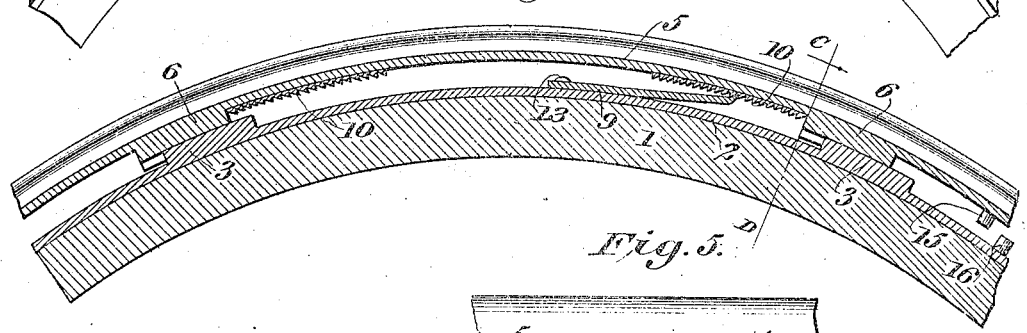
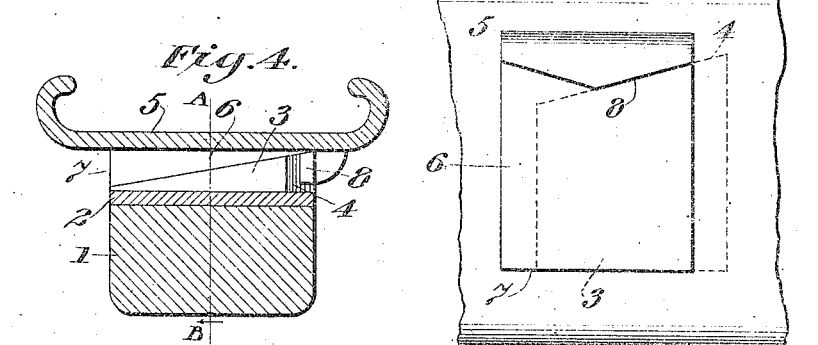
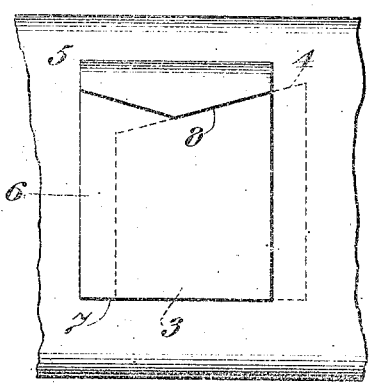
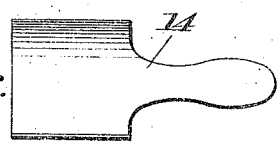
Inventor
Ira D. Walter
by
Attorney

UNITED STATES PATENT OFFICE.

IRA D. WALTER, OF HARRISBURG, ARKANSAS, ASSIGNOR OF FIFTY-THREE ONE-HUNDRED-AND-FIFTIETHS TO JOSIAH BRINKERHOFF, ONE-TENTH TO BENJAMIN F. COLE, ONE-TWENTIETH TO THOS. FLOURNOY, ONE-FIFTIETH TO JAMES W. GANT, ONE-TWENTIETH TO JODIE G. GANT, AND ONE-FIFTIETH TO SAMUEL A. LATIMER, ALL OF HARRISBURG, ARKANSAS, AND ONE-TENTH TO CLINTON B. BAILEY, OF WYNNE, ARKANSAS.

DEMOUNTABLE RIM FOR WHEELS.

1,181,088.  Specification of Letters Patent.  Patented Apr. 25, 1916.

Application filed November 1, 1915. Serial No. 59,084.

*To all whom it may concern:*

Be it known that I, IRA D. WALTER, a citizen of the United States, residing at Harrisburg, in the county of Poinsett and State of Arkansas, have invented a certain new and useful Improvement in Demountable Rims for Wheels, of which the following is a full, clear, and exact description.

The object of this invention is to provide for the ready renewal of wheel tires, especially on motor vehicles.

Instead of providing for the removal of the injured or worn tire alone, the present invention effects renewal by means of a demountable rim on which the pneumatic or other tire is already placed ready for use.

The invention consists of a two-part rim having interlocking means, one of the parts being stationarily placed upon the wheel or its felly, and the other being applicable thereto and removable therefrom at pleasure, the interlocking of the two being effected by interengaging lugs and the forward movement of the wheel without resort to bolts or other extraneous fastenings, as I will proceed now to explain and finally claim.

In the accompanying drawings illustrating the invention, in the several figures of which like parts are similarly designated, Figure 1 is a perspective view of part of the demountable member of the rim. Fig. 2 is a perspective view of the stationary member and felly. Fig. 3 is a central longitudinal section on line A B, Fig. 4, of the assembled rim and felly. Fig. 4 is a transverse section on line C D, Fig. 3. Fig. 5 is an inverted plan view of the interlocking parts. Figs. 6 and 7 show tools for removing the rim.

The rim may be applied to any ordinary wheel construction having a felly, such as 1. The rim member 2 is stationarily applied to the felly in any suitable way, and in accordance with my invention bears upon its peripheral surface one of the complementary interlocking elements. As shown in the drawings this element is a transversely arranged wedge-like lug or projection 3, having its radially disposed head 4 inclined circumferentially or in the direction of the length of the member 2. The demountable member 5 is provided with similar transversely arranged inclined wedge-like lugs or projections 6, the heads 7 of which are substantially parallel with the edge of the rim and the points of which are provided with the radially disposed doubly inclined extensions 8 arrranged circumferentially or in the direction of the length of the member 5, so as to adapt the demountable rim for right or left hand use. The rim member 2 is provided with a spring or other movable dog 9, and the other member 5 with a series of notches or teeth 10 adapted to be engaged by the dog. These notches or teeth may be made integral with the member 5 but preferably and as herein shown are made upon a separate hardened steel plate attached to the member 5 by rivets or other suitable means. Two sets of notches or teeth 10 are provided to adapt the rim for right or left hand use. The lugs 3 and 6 and the dogs and notches may be used in any desired number, disposed at intervals upon the rim members. The rim member 5 may be provided with any suitable means for receiving and securing the tire. The rim member 2 may be provided with an angular slot 11, and the felly have a similar slot 12 to receive the stem of the inflation valve when one is used, to conform to the circumferential and lateral adjustment of the outer rim member presently explained.

In order to assemble the rim members, the demountable member 5 is moved laterally on to the stationary rim member 2 in such way that the lugs thereon escape the lugs on the latter, and the inclined heads 4 are alined with the inclined extensions 8 and then the demountable member is turned circumferentially so as to cause the inclined lugs to ride one another while the inclined head 4 acting against one of the inclines 8 (as indicated in Fig. 5) will force the demountable member into lateral engagement and vertical alinement with the stationary member. In order that the inclined heads 4 and the inclined extensions 8 may be easily adjusted into proper alinement, the rim member 2 may be and is here shown as provided with stop lugs 7' adapted to coact with those ends of the lugs 6 on which are the extensions 8 to limit the lateral movement of the demountable rim member 5 upon the rim member 2. The final adjustment of the demountable member is effected by the forward movement of the wheel, the traction of the tire serving to pull the said member into final position, the dogs 9 automatically engaging with the notches 10 step by step so as to hold the thus assembled rim members immovably. As shown herein these dogs are fixedly mounted upon the rim member by rivets 13, but obviously other forms of locking devices may be used.

The construction shown wholly obviates the necessity for the use of bolts or other extraneous fasteners, and provides a simple and effective means for readily replacing an injured or worn tire. The demountable rim obviously is as readily released and removed as it was placed in position, and for this purpose it is sufficient to insert a tool 14, Fig. 6, having a blade curved to conform to the curvature of the wheel between the point of the dog 9 and the teeth 10 to withdraw the locking dog or dogs and reverse the movement of the demountable rim so as to disengage the inclined lugs or projections. In order to facilitate the reverse movement of the rim member 5, lugs 15 are provided on the member 5 and lugs 16 on the felly 2, these lugs being in such relation to each other when the member 5 is fixed on the rim as to permit of the insertion of the wedge-shaped tool 17, Fig. 7, between them. It will thus be seen that by the movement of the tool with the lugs 15 and 16 as a leverage the reverse movement of the member 5 may be started. To fit the rim for use either on a right or left hand wheel, it is provided with two of the lugs 15 spaced a suitable distance apart.

As already sufficiently indicated, some of the advantages of the invention are that the demountable rim with its attached tire may be applied and adjusted practically automatically. The tightening and locking of the demountable rim in locked position is ultimately effected by the forward movement of the car. As just stated, the demountable rim is almost instantaneously released by reversing the locking dogs. The construction avoids all tedious adjustment of a series of wedges and bolts, as in some prior constructions, which are necessary in assembling and removing the rim.

Still another important feature of the invention is that instead of friction and wear tending to loosen the rim on the wheel, such wear is constantly taken up automatically, and the harder the pull or strain on the tire, the tighter the rim is drawn into position, and yet the demountable rim cannot possibly be forced on so tight as to jam the dogs into immovable position.

The invention is susceptible of variations within the meaning and scope of the claims following.

What I claim is:—

1. A demountable rim for wheels, comprising a fixed member and a demountable member, transversely inclined interengaging wedge-like lugs on said members, and interlocking circumferentially inclined radial portions on one side of said lugs adapted by the rotation of one of said members to effect a lateral movement of the demountable member and a lateral wedging action between said wedge-like lugs.

2. A demountable rim for wheels, comprising a fixed member and a demountable member, transversely inclined interengaging wedge-like lugs on said members, and interlocking circumferentially inclined radial portions on one side of said lugs adapted by the rotation of one of said members to effect a lateral movement of the demountable member and a lateral wedging action between said wedge-like members, and interlocking means on the rim members to lock said members in their adjusted position against displacement circumferentially.

3. A demountable rim for wheels, comprising a fixed member having transversely inclined wedge-like lugs thereon provided with circumferentially inclined heads, and a demountable member having transversely inclined wedge-like lugs to engage the wedge-like lugs on the fixed member and provided at their points with circumferentially inclined projections adapted to interlock and coact with the inclined heads of the wedge-like lugs on the fixed member and effect a lateral movement of the demountable member and a lateral wedging action of the wedge-like members.

4. A demountable rim member for wheels, having transversely arranged wedge-like lugs for engaging complemental parts on the wheel and radially and circumferentially disposed doubly inclined extensions adapted to interchangeably engage complemental portions on the wheel.

5. A demountable rim for wheels, comprising a fixed member and a demountable member, and inclined interlocking lugs or projections on these members adapted to effect the positioning of the demountable member by a wedging action, and a spring dog on one of the members adapted to engage notches on the other member step by step to automatically lock the members in adjusted position.

In testimony whereof I have hereunto set my hand this 28th day of October, A. D. 1915.

IRA D. WALTER.

Witnesses:
R. B. VAUGHAN,
J. BRINKERHOFF.

Copies of this patent may be obtained for five cents each, by addressing the "Commissioner of Patents, Washington, D. C."